United States Patent [19]

Bouwhuis

[11] Patent Number: 5,309,239
[45] Date of Patent: May 3, 1994

[54] IMAGE PICK-UP DEVICE

[75] Inventor: Gijsbertus Bouwhuis, Eindhoven, Netherlands

[73] Assignee: U.S. Philips Corporation, New York, N.Y.

[21] Appl. No.: 906,975

[22] Filed: Jun. 30, 1992

[30] Foreign Application Priority Data

Jul. 11, 1991 [EP] European Pat. Off. ......... 91201805.8

[51] Int. Cl.⁵ ............................................ H04N 5/225
[52] U.S. Cl. .................................. 348/265; 359/563; 348/342
[58] Field of Search ............... 358/225, 209, 213.15, 358/226, 213.11; 250/550, 208.1, 237 G; 359/563, 568; H04N 5/225

[56] References Cited

U.S. PATENT DOCUMENTS

| | | | |
|---|---|---|---|
| 3,546,374 | 12/1970 | Grasser | 359/563 |
| 3,573,353 | 4/1971 | Henriques et al. | 359/503 |
| 4,575,193 | 3/1986 | Greivenkamp | 358/55 |
| 4,971,409 | 11/1990 | Yeh et al. | 359/568 |
| 4,998,800 | 3/1991 | Nishida et al. | 358/47 |
| 5,132,802 | 7/1992 | Osthues et al. | 358/213.28 |

FOREIGN PATENT DOCUMENTS

| | | | |
|---|---|---|---|
| 272634A | 6/1988 | European Pat. Off. | H04N 9/4 |
| 3938199 | 5/1990 | Fed. Rep. of Germany | H04N 5/22 |
| 3-274971 | 12/1991 | Japan | H04N 5/225 |

Primary Examiner—Joseph Mancuso
Assistant Examiner—Tuan V. Ho
Attorney, Agent, or Firm—Edward H. Goodman

[57] ABSTRACT

An image pick-up device with an electronic image sensor ($IS_1IS_2$) is described, which includes a matrix of sensor elements (SE) and a low-pass filter for suppressing image frequencies exceeding the sampling frequency of the sensor. The low-pass filter has a first, composite filter function ($F_{com}$) consisting of a variable component and a constant component and the device has a second filter function ($F_c$) in conformity with the constant component which is optically or electronically subtracted from the first filter function.

7 Claims, 2 Drawing Sheets

IMAGE PICK-UP DEVICE

BACKGROUND OF THE INVENTION

1. Field of the Invention

The invention relates to an image pick-up device comprising an imaging lens system, a radiation-sensitive detection system comprising discrete detection elements arranged in a regular pattern with a given period, and a low-pass filter for suppressing image frequencies which exceed the spatial sampling frequency of the detection system.

2. Description of the Related Art

A device of this type may form part of an electronic video camera or of an electronic photocamera and is known, for example, from U.S. Pat. No. 4,575,193.

A sensor termed "CCD" (Charge-Coupled Device) is currently used in such cameras. Such a sensor comprises a, for example, two-dimensional matrix of small radiation-sensitive elements which are integrated with an electronic circuit with which the elements are read line or matrix-sequentially. The radiation-sensitive elements have dimensions of the order of, for example $10 \times 10$ $\mu m^2$ and a sensor may comprise several hundred rows and columns of such elements. Such a sensor performs, as it were, a spatial sampling of the image applied thereto, the spatial sampling frequency being determined by the spatial frequency of the sensor matrix. Due to this image sampling, the image reconstructed from the image sensor signals will exhibit a Moiré effect because the image formed on the sensor has spatial frequencies which are higher than the sampling frequency. This Moiré effect, also referred to as aliasing, results in a pattern of blocks and flicker of the reconstructed image.

To prevent the Moiré effect it has already been proposed, for example, in U.S. Pat. No. 4,575,193, to arrange a low-pass filter between the imaging lens system and the detection system, which filter blocks the image frequencies exceeding half the sampling frequency. In the known device, the low-pass filter comprises one or more birefringet plates, for example, quartz plates which split a beam incident thereon into, for example, two beams. This creates on the image sensor, for example, two images which are slightly offset with respect to each other. The resultant composite image is then slightly extended version of the original image, with the extended version having a smaller resolution.

Practice has proved that the birefringent plates cause a reduction of the modulation transfer function of the image pick-up device, which reduces the pick-up quality.

SUMMARY OF THE INVENTION

The present invention has for its object to provide an image pick-up device with a matrix sensor in which a novel concept of filtering is used and which yields a considerably better pick-up result.

The device according to the invention is characterized in that the low-pass filter has a first, composite filter function consisting of a variable component and a constant component, and in that the device has a second filter function in conformity with said constant component.

The invention is based on the recognition that the ideal filter function which has a rectangular characteristic in the frequency domain and thus a sine function in the spatial or image domain, with negative parts which cannot be realized optically, can be obtained by adding to the filter function a constant and by subtracting this constant at a later stage.

An image-information transporting channel comprises the optical path from the imaging lens up to and including a detector in this path and the electronic means coupled to this detector for processing the image information specific for that channel. A color television camera with three sensors comprises three image-information transporting channels, each one for one of the primary colors—red, green and blue. A color television camera with one image sensor (detector) having separate sensor elements for the three primary colors, or a black and white camera, has only one image-information transporting channel.

A first embodiment of the device according to the invention is characterized in that a beam splitter is arranged between the imaging lens system and the detection system, in that the filter having the composite filter function is arranged in the path of a first sub-beam coming from the beam splitter, and a second filter having a filter function which is equal to the constant component of that of the first filter is arranged in the path of a second sub-beam coming from the beam splitter, in that the detection system comprises two identical sub-detection systems, one of which is arranged behind the first filter and the other is arranged behind the second filter, and in that the outputs of the detection systems are connected to an electronic signal processing circuit in which the signals of corresponding elements of the first and the second sub-detection system are subtracted from each other.

A second embodiment of the device according to the invention is characterized in that the filter having the composite filter function is arranged between the imaging lens system and the detection system, and in that the output of the detection system is connected to an electronic signal processing circuit in which the signals of the detection system elements are reduced with a signal value in conformity with the constant component of the composite filter function.

Both embodiments may be further characterized in that the filter having the composite filter function is a grating.

Alternatively, the two embodiments may be characterized in that the filter having the composite filter function is constituted by a filter having a constant filter function and a mirror arranged in front of said filter, which mirror is rotatable from a neutral position with respect to the axis of the imaging beam, the angular velocity of the mirror increasing with an increasing deviation from the neutral position. The composite filter function is then simulated by a defined movement of the image across the sensor.

BRIEF DESCRIPTION OF THE INVENTION

The invention will now be described in greater detail with reference to the accompanying drawings, in which.

DESCRIPTION OF THE PREFERRED EMBODIMENT

Figure 1:
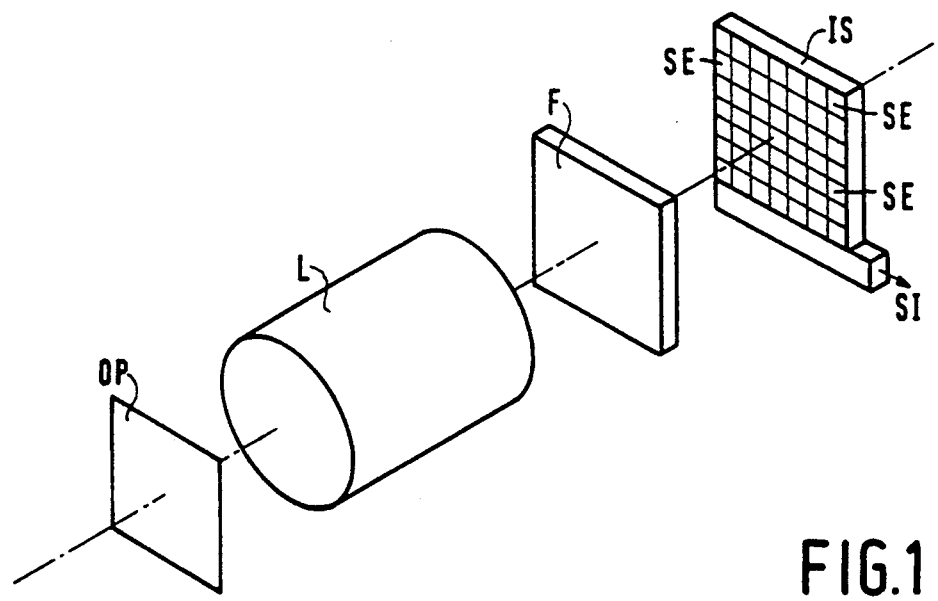
FIG. 1 shows the principle of the image pick-up device with an electronic image sensor.

FIG. 1 shows the principle of an image pick-up device with an image sensor IS, for example, a CCD sensor having a large number of discrete radiation-sensitive elements SE arranged in rows and columns. These elements are integrated in known manner with an electronic circuit with which the image information supplied by the elements can be read row by row or column by column. The image sensor supplies an output signal SI. An object or scene (not shown) which is present in the object plane Op is imaged on the image sensor by a lens system L.

Figure 2:
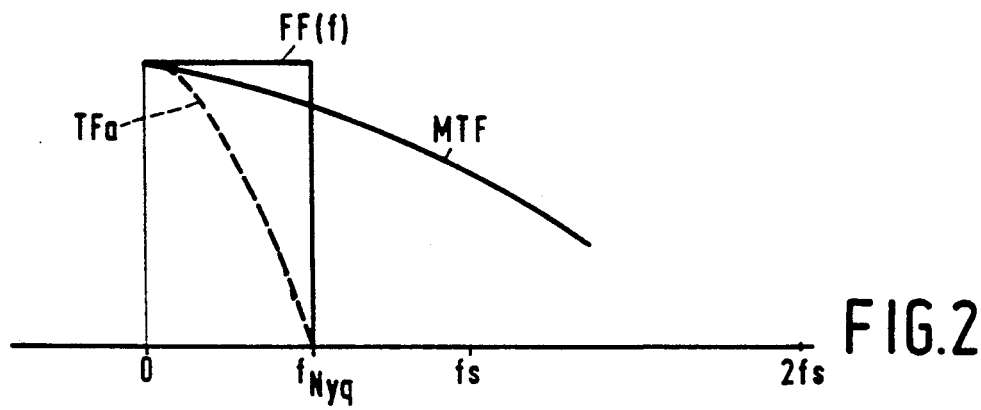
FIG. 2 shows the modulation transfer function and the ideal filter function in the frequency domain.

This lens system has a given transfer function referred to as the modulation transfer function or MTF. The modulation or contrast transfer function is defined as the ratio between the contrast in the image and that in the object. This modulation transfer function decreases with an increasing spatial frequency in the object. At a limit frequency, referred to as the optical cut-off frequency, this function is zero. The optical cut-off frequency $f_c$ is given by $f_c = 2.N.A./\lambda$ in which N.A. is the numerical aperture of the lens system and $\lambda$ is the wavelength of the imaging beam. FIG. 2 shows a part of the modulation transfer function MTF plotted against the spatial frequency. The reference $f_s$ denotes the spatial frequency of the image sensor. For a special embodiment of the image sensor with a unidirectional period of the order of 7 $\mu$m, $f_s$ thus is 140/mm.

The image formed on the image sensor is sampled in accordance with the Nyquist criterion, i.e. the sampling frequency is equal to at most half the spatial frequency $f_s$ of the sensor elements. The sampling frequency is denoted by $f_{Nyq}$ in FIG. 2. To prevent a Moiré effect in the image reconstructed from the image sensor signals it should be ensured that the spatial frequencies in the image formed on the sensor and exceeding the sampling frequency are suppressed. To this end a filter F is arranged between the lens system and the detection system, as is shown in FIG. 1. An ideal filter for this purpose, with which the image still appears with sufficient fidelity, has a rectangular characteristic in the frequency domain, as is shown by means of the line FF(f) in FIG. 2.

In the image or spatial domain, the filter function is the Fourier transform of this rectangle. This function, which is denoted by FF(x) in FIG. 3 and is also referred to as sine function, has negative parts Np which means that for given positions in the image, the intensity should be negative, which is principally impossible. Attempts have been made to approximate this sine function by designing a filter in such a way that the negative parts of the sine function disappear. The transfer function in the frequency domain, i.e. the product of the MTF and the filter function which is then obtained has a variation as is shown by means of the broken-line curve $TF_a$ in FIG. 2. The transfer function falls rapidly so that the higher frequency information of the object is not completely transferred.

Figure 3:
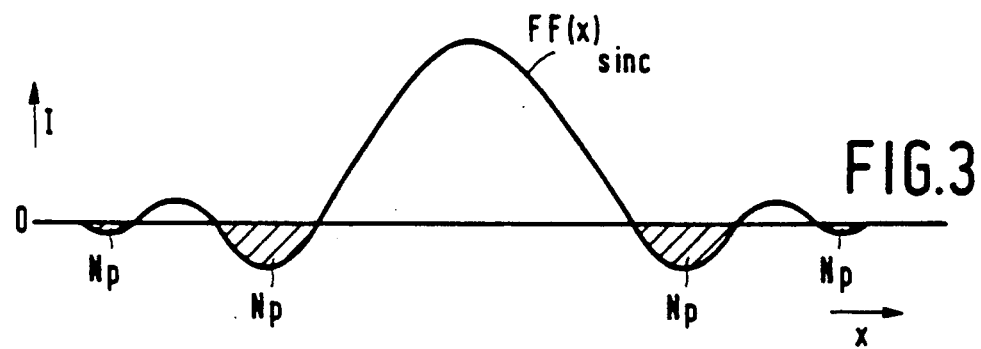
FIG. 3 shows the ideal filter function in the image domain.
Figure 4:
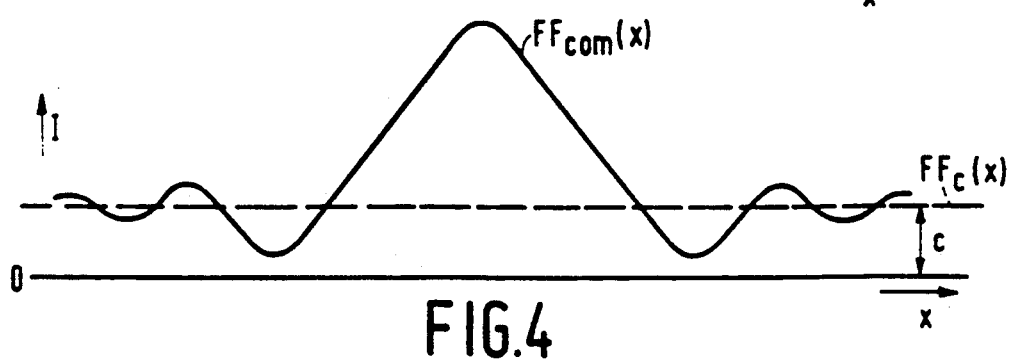
FIG. 4 shows the principle of the filter according to the invention.

According to the invention the image domain function shown in FIG. 3 is realized by making use of two filter functions, the first of which being equal to the desired sine function plus a constant and the second being equal to this constant, and by subtracting these filter functions from each other. These first and second functions are denoted by $FF_{com}(x)$ and $FF_c(x)$ in FIG. 4. The image signal supplied by the image sensor as a response to the image supplied to the sensor thus undergoes two filtering operations. These filtering operations can be realized by means of two optical filters. However, it is alternatively possible to use only one optical filter and to perform the second filtering operation electronically.

Figure 5:
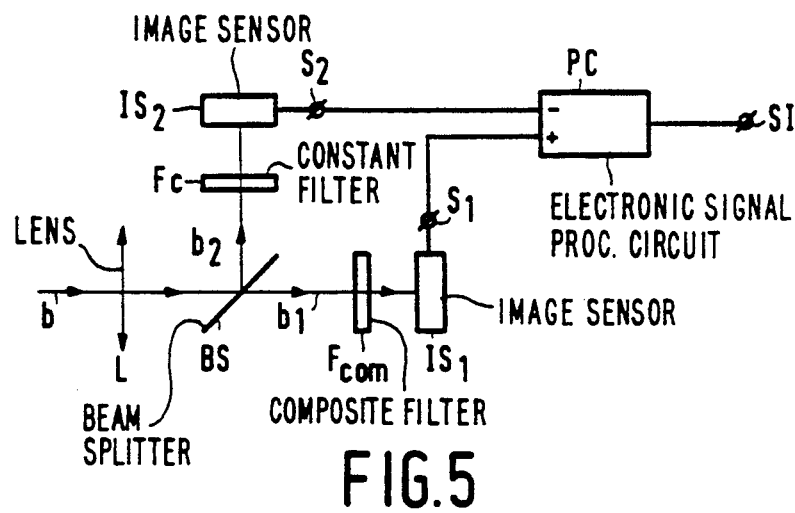
FIG. 5 shows a first embodiment of an image pick-up device according to the invention.

FIG. 5 shows the principle of double optical filtering. The beam b passing through the lens system L is split into a sub-beam $b_1$ and a sub-beam $b_2$ by a beam splitter BS. The sub-beam $b_1$ passes the filter $F_{com}$ having the composite filter function $FF_{com}(x)$ and is then incident on a first image sensor $IS_1$. This image sensor supplies a signal $S_1$. The sub-beam $b_2$ passes the filter $F_c$ having the constant filter function $FF_c(x)$ and is incident on a second image sensor $IS_2$ which is identical to the sensor $IS_1$. The image sensor $IS_2$ supplies a signal $S_2$. The signals $S_1$ and $S_2$ are applied to an electronic signal processing circuit PC which is adapted in such a way that the signals of the corresponding individual sensor elements of the two image sensors are subtracted from each other. The circuit PC supplies an image signal SI which seems to be generated by an imaging beam which is filtered in accordance with the filter function FF(x) of FIG. 3.

Figure 6:
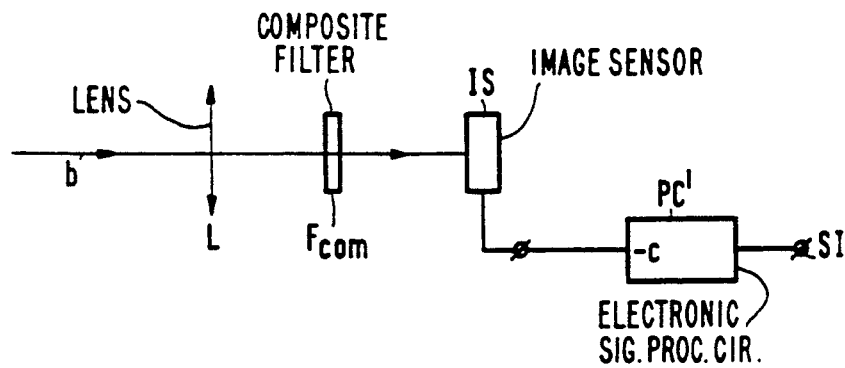
FIG. 6 shows a second embodiment of this device.

FIG. 6 shows the circuit diagram of the device according to the invention in which only one optical filter is used. This filter $F_{com}$ is again a filter having the filter function $FF_{com}(x)$ of FIG. 4. The beam b passed by this filter is converted by the image sensor IS into a signal S which is applied to the signal processing circuit PC'. In this circuit the signals of all individual sensor elements are reduced by a constant value of C, which is the value of the filter function $FF_c(x)$ of FIG. 4. The output signal SI of this circuit again seems to be generated by an imaging beam which is filtered in accordance with the filter function $FF_c(x)$ of FIG. 3. A directive may be $C \geq 0.22$.

Like a conventional optical low-pass filter, the filter $F_{com}$ may consist of a grating, i.e. a transparent plate, one surface of which is provided with alternating transparent strips and absorbing or reflecting strips (an amplitude grating), or a transparent plate, one surface of which is proved with alternating grooves and lands. The filter function $FF_{com}$ is obtained by adapting the grating parameters such as the grating period, the ratio between the width of the grating strips and that of the intermediate strips, or the grating groove depth in the case of a phase grating. Such a grating may also be manufactured by means of holographic techniques and may be, for example, a computer-generated hologram. The advantage of gratings is that they can be manufactured at low cost in large quantities by means of known replica techniques, starting from a suitable mould. This is particularly important when using the invention in cameras for consumer use.

Figure 7:
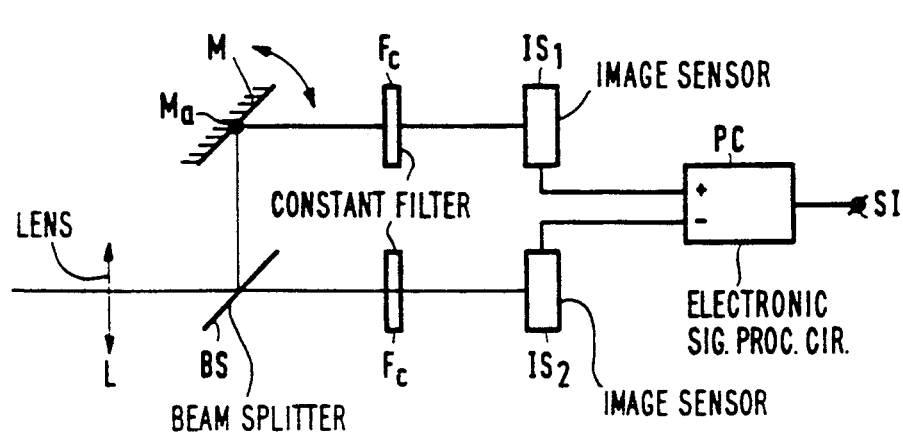
FIG. 7 shows a third embodiment of this device.

A further possibility of obtaining the composite filter function $FF_{com}(x)$ is shown in FIG. 7. Then use is made of a mirror M in the path of the sub-beam $b_1$, which mirror is oscillated around a shaft Ma perpendicular to the plane of the drawing. The rotational speed of the mirror is not constant but angle-dependent, i.e. around the neutral position, for example, 45° the mirror moves slowly and as the deviation from the neutral position becomes larger, the mirror moves faster. As a result the sub-beam b₁ is moved across the image sensor in accordance with the function of FIG. 4, in which x is then the time axis. The spatial position of the mirror is thus translated to a scanning speed of the beam with respect to the sensor.

As is shown in FIG. 7, a constant filter function can be subtracted from the composite filter function in the way as is shown in FIG. 5, i.e. with a beam splitter BS and a filter $F_c$ arranged in the path of the second sub-beam $b_2$, which filter is now also present in the path of the first sub-beam $b_1$, and with a processing circuit PC which is identical to that of FIG. 5. In the device in which the rotating mirror is used, the constant filter function $FF_c(x)$ can also be subtracted electronically in a manner analogous to that shown in FIG. 6. Then the device has a structure as that of FIG. 6, but with a rotatable element for the filter $F_c$.

It has been assumed in the foregoing that the filters vary in the x direction only, hence are one-dimensional filters. For two-dimensional image scanning the filters vary in two directions and hence the filter functions are $FF_{com}(x, y)$ and $FF_c(x, y)$.

Three separate image sensors for the colors red, green and blue can be used in color cameras. Then three separate filters according to the invention must also be used. However, it is alternatively possible to pick up a color image by means of one image sensor which comprises, for example, three times as many radiation-sensitive elements as a black-white image sensor and in which color filters are arranged in front of the sensor elements. As is noted in U.S. Pat. No. 4,575,193, the low-pass filter according to the invention must then be made color-independent.

I claim:

1. An image pick-up device comprising an imaging lens system, an optical radiation-sensitive detection system having discrete detection elements arranged in a periodic pattern with a given period, and low-pass filter means for suppressing image frequencies which exceed the spatial frequency of the detection system, characterized in that the low-pass filter means comprises, for each image-information transporting channel:

first filter means constituted by an optical filter having a filter function composed of a required variable component and an additional constant function forming a composite filter function; and second filter means having a filter function corresponding to said additional constant function, wherein the combination of said first and second filter means constitutes said low-pass filter means and provides the required variable filter function whereby the filter function of said second filter means is subtracted from the filter function of said first filter means thereby cancelling said additional constant functions and leaving said required variable filter function.

2. An image pick-up device as claimed in claim 1, characterized in that a beam splitter is arranged between the imaging lens system and the detection system, in that the filter having the composite filter function is arranged in the path of a first sub-beam coming from the beam splitter, and a second filter having a filter function which is equal to the constant component of that of the first filter is arranged in the path of a second sub-beam coming from the beam splitter, in that the detection system comprises two identical sub-detection systems, one of which is arranged behind the first filter and the other is arranged behind the second filter, and in that the outputs of the detection systems are connected to an electronic signal processing circuit in which the signals of corresponding elements of the first and the second sub-detection system are subtracted from each other.

3. An image pick-up device as claimed in claim 2, characterized in that the filter having the composite filter function is a grating.

4. An image pick-up device as claimed in claim 2, characterized in that the filter having the composite filter function is constituted by a filter having a constant filter function and a mirror arranged in front of said filter, which mirror is rotatable from a neutral position with respect to the axis of the imaging beam, the angular velocity of the mirror increasing with an increasing deviation from the neutral position.

5. An image pick-up device as claimed in claim 1, characterized in that the first filter means, having the composite filter function, is arranged between the imaging lens system and the detection system, and in that the output of the detection system is connected to an electronic signal processing circuit in which the signals of the detection system elements are reduced with a signal value conforming a change in a beam applied to the first filter means caused by the constant component of the composite filter function.

6. An image pick-up device as claimed in claim 5, characterized in that the filter having the composite filter function is a grating.

7. An image pick-up device as claimed in claim 5, characterized in that the filter having the composite filter function is constituted by a filter having a constant filter function and a mirror arranged in front of said filter, which mirror is rotatable from a neutral position with respect to the axis of the imaging beam, the angular velocity of the mirror increasing with an increasing deviation from the neutral position.

* * * * *